United States Patent [19]
Whitescarver et al.

[11] Patent Number: 4,761,182
[45] Date of Patent: Aug. 2, 1988

[54] PROCESS FOR USING SLUDGE FROM GEOTHERMAL BRINE TO MAKE CONCRETE AND CONCRETE COMPOSITION

[75] Inventors: Olin D. Whitescarver, Indian Wells; Jonathan T. Kwan, Santa Maria; M. Kenneth Chan, Los Angeles; Daniel P. Hoyer, Palm Desert, all of Calif.

[73] Assignee: Union Oil Co. of California, Los Angeles, Calif.

[21] Appl. No.: 35,922

[22] Filed: Apr. 8, 1987

Related U.S. Application Data

[63] Continuation of Ser. No. 838,537, Mar. 11, 1986, abandoned.

[51] Int. Cl.$^4$ .............................................. C04B 18/04
[52] U.S. Cl. .................................. 106/98; 106/97; 106/DIG. 1; 210/751
[58] Field of Search ..................... 106/97, 98, DIG. 1; 210/751

[56] References Cited

U.S. PATENT DOCUMENTS

| | | | |
|---|---|---|---|
| 4,113,504 | 9/1978 | Chen et al. | 106/97 |
| 4,142,912 | 3/1979 | Young | 106/98 |
| 4,210,457 | 7/1980 | Dodson et al. | 106/DIG. 1 |
| 4,226,630 | 10/1980 | Styron | 106/DIG. 1 |
| 4,302,328 | 11/1981 | Van Note | 210/714 |

FOREIGN PATENT DOCUMENTS

| | | | |
|---|---|---|---|
| 2826956 | 1/1980 | Fed. Rep. of Germany | 106/98 |
| 527395 | 6/1977 | U.S.S.R. | 106/98 |

OTHER PUBLICATIONS

"Biobricks Become a Construction Reality", by Dr. Edward H. Bryan; Water/Engineering and Management, 3/84, pp. 38–39, 59.

Primary Examiner—Steven Capella
Attorney, Agent, or Firm—Walter A. Hackler

[57] ABSTRACT

A process is provided for using silicious sludge (filter cake), obtained by precipitation of silica from silica-rich geothermal brine, to make a concrete material (geocrete). The process includes combining the sludge with a cementing material, such as portland cement and/or flyash and activating the cementing material with an activating media. When portland cement is used as the cementing material, the activating media is water. In such case, the sludge is preferably dewatered and the residual water content is determined, the entrapped brine adding to the water content of the mixture. Preferably, the dry weight ratio of sludge to cementing material is about 2:1 to about 3:1; although, ratios as high as 9:1 can be used when high strength of the geocrete is not required. The preferred amount of water used is about 40 weight percent, including water content of the sludge, which may typically be between about 10 and about 30 weight percent. The sludge may contain hazardous or toxic materials which precipitate from the brine with the silica and which are present in the entrapped brine; therefore, the sludge may be water washed before use to flush out residual brine and some contaminants contained in the sludge or may be otherwise treated. Chlorides present in the brine, which may undesirably accelerate setting time, are also removed by the water wash. Slurry mixability of the geocrete is enhanced by the addition of coarse aggregate to the mix, the preferred amount of aggregate added being less than about 50 weight percent of the dry mixture. A cement having a 60 day cure compression strength of at least about 3000 psig is thereby provided. A corresponding composition of concrete is provided.

29 Claims, 4 Drawing Sheets

PROCESS FOR USING SLUDGE FROM GEOTHERMAL BRINE TO MAKE CONCRETE AND CONCRETE COMPOSITION

This application is a continuation of application Ser. No. 838,537, filed Mar. 11, 1986, abandoned.

BACKGROUND OF THE INVENTION

1. Field of the Invention

The present invention relates generally to the production of steam from silica-rich geothermal brine and especially to processes for using silicious sludge obtained from silica-rich geothermal brine as a by-product of such steam production.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity, Thus, as an example, geothermal aquifers are not uncommon along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has been directed to the exploitation of geothermal resources for production of electrical power which can be conducted, often over existing power grids, for long distances from the geothermal sources. In particular, recent steep increases in the cost of petroleum products used for conventional production of electric power, as well as actual or threatened petroleum fuel shortages or embargos, have intensified the interest in use of geothermal fluids as an alternative, and generally self-renewing, source of power plant "fuel."

General processes by which geothermal fluids can be used to generate electric power have been known for some time. As an example, geothermal steam, after removal of particulate matter and such polluting gases as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence. Cooler geothermal brine or water can often be used to advantage in binary systems in which a low-boiling point, secondary liquid is vaporized by the hot geothermal liquid, the vapor produced being used to operate gas turbine generators; again, the cooled brine is typically reinjected into the ground.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, even by the late 1970's, geothermal steam at the Geysers in Northern California was generating about two percent of all the electricity used in California.

While energy production facilities at important geothermal steam sources, such as at The Geysers, are generally still being expanded, the known number of important geothermal steam aquifers is small compared to that of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric power generating plants, much of this effort within the United States being expended towards use of vast geothermal brine resources in the Imperial Valley of southern California.

Although, as above-mentioned, general processes are known for using geothermal brine or water for production of electric power, serious problems, especially with the use of typically highly saline geothermal brine, are often encountered in practice. These problems are frequently so great as to prevent the production of electric power at competitive rates and, as a consequence, greatly impede the progress of flashed geothermal brine power plant development in many areas of the world.

These severe problems associated with the use of geothermal brines are principally caused by the usually complex composition of geothermal brines. At natural, aquifer temperatures in excess of about 400° F. and pressures in the typical range of 400 to 500 psig, the brines leach large amounts of salts, minerals and elements from aquifer formations, the brines presumably being in chemical equilibrium with their formations. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As natural brine pressure and temperature are substantially reduced in power plant steam production (flashing) stages, chemical equilibrium of the brine is disturbed and saturation levels of impurities in the brine are typically exceeded. This causes impurities and silica to precipitate from the brine, as a tough scale, onto surrounding equipment walls and in reinjection wells, often at a rate of several inches in thickness per month. Assuming, as is common, that the brine is supersaturated with silica at the wellhead, in high temperature portions of the brine handling system, for example, in the high pressure brine flashing vessels, heavy metal sulfide and silicate scaling typically predominates. In lower temperatures portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations, unless scale reducing processes are used, is often necessary. Associated injection wells may also require frequent and extensive rework due to scale buildup and new injection wells may periodically have to be drilled at great cost.

Therefore, considerable effort has been, and is being, directed towards developing effective processes for eliminating, or at least very substantially reducing, silica scaling in flashed geothermal brine handling systems. One such scale reduction process, disclosed in U.S. Pat. No. 4,439,535 to Featherstone, et al., involves the induced precipitation of scale-forming materials, principally silica, from the brine in the flashing stage by contacting the flashed brine with silica or silica-rich seed crystals. When the amount of silica which can remain dissolved in the brine is exceeded by the brine being flashed to a reduced pressure, silica leaving solution in the brine deposits onto the seed crystals. Not only do the vast number of micron-sized seed crystals introduced into the flashing stage provide a very much larger surface area than the exposed surfaces of the flashing vessels but also the silica from the brine tends to preferentially deposit onto the seed crystals for chemical reasons. Substantially all of the silica leaving the brine therefore, precipitates onto the seed crystals instead of precipitating as scale onto vessel and equipment walls and in injection wells.

Typically, the crystallized silica precipitate is settled from the brine in a downstream reactor-clarifier stage, the clarified brine overflow therefrom being flowed on to a filtering stage and then to a reinjection stage. Some of the silica precipitate (sludge) from the reactor clarifier may be pumped back upstream into the flash crystallization stage as seed material, the remainder being dewatered and removed from the facility for disposal. The amount of such silica sludge requiring disposal is, however, relatively large. For example, for a 10 megawatt power plant which requires a brine flow rate of about 1.3 million pounds an hour, more than six tons a day of silica sludge may be produced and require disposal.

During the silica crystallization process, many other materials precipitate from the brine onto the seed material along with the silica. The produced sludge, herein referred to as silica or silicious sludge, although mostly silica, also typically contains significant amounts of barite and heavy metals, such as lead, copper and zinc, which, above specific levels of concentration, may be considered as toxic and may therefore require disposal at specially designated toxic waste dumps. The costs associated with disposal of toxic silica sludge are substantial and can be expected to increase as additional and larger geothermal brine power plants are constructed and more silicious sludge is produced, as allowable concentrations of heavy metals in the sludge are reduced to meet anticipated stricter environmental requirements and as toxic waste dumps become fewer and/or more remotely located. Even when the silicious sludge produced is non-toxic, it may, nevertheless, contain small particles and/or polluting materials which may, in time, be eroded or leached out by rain or ground water, thereby creating environmental problems unless care is taken to properly dispose of the sludge. Such sludge disposal, even when the sludge is non-toxic, can be very costly.

It is, therefore, an object of the present invention to provide a process for using geothermal sludge to make a novel concrete material which can be used for construction purposes, the cementing material, used with the sludge to make the concrete, causing the small particles, impurities and contaminants in the sludge to be substantially fixed in the concrete.

Another object is to provide a novel composition of concrete using sludge from geothermal brine as a constituent thereof.

Additional objects, advantages, and features of the invention will become apparent to those skilled in the art from the following description.

SUMMARY OF THE INVENTION

A process, according to the present invention, is provided for using silicious sludge precipitated from a silica-rich geothermal brine to produce a concrete (geocrete) material. The process comprises combining the silicious sludge precipitated from the brine with a cementing material capable of being activated by an activating media and combining with the silicious sludge and the cementing material a sufficient amount of activating media to cause the cementing material to be activated. Included is the step of permitting the mixture of silicious sludge, cementing material and activating media to cure into a concrete material. Preferably the activating material is water, the steps of determining the water content of the silicious sludge and establishing a dry weight of the sludge, then preferably being included in the process.

The dry weight ratio of the sludge to the cementing material may be between about 1 and about 9, with the preferred range being between about 1 and about 3.

In some instances, the process may provide for the combining a coarse aggregate material with the silicious sludge and the cementing material, the preferred dry weight percentage of the coarse aggregate in the mixture of the aggregate, the sludge and the cementing material being less than about 50% and the preferred dry weight percentage of the silicious sludge in the mixture of the aggregate, the sludge and the cementing material being between about 30% and about 90%. When the activating media is water, the process may include the step of dewatering the silicious sludge so that the weight percent water content of the sludge is less than about 30%. The preferred weight percent of water, including the water contained in the sludge, combined with the silicious sludge and the cementing material is between about 20% and about 50% of the combined dry weight of the sludge and the cementing material, the more preferred weight percent of water being about 40%. When aggregate is combined with the sludge and cementing material, the weight percent of water used, including the water contained in the sludge, is preferably between about 20% and about 50% of the combined dry weight of the sludge, the cementing material and the aggregate, with the more preferred weight percent of water being about 40%.

Because of the silica content in the sludge, the cementing material of perference is portland cement which is a hydraulic cement made by finely pulverizing the clinker produced by calcining to incipient fusion a mixture of argillaceous and calcaneous materials. Flyash may also be used as a cementing material. To reduce the amount of undesirable contaminants from the sludge it may be preferred to include the step of water washing the silicious sludge before the combining thereof with the cementing material, thereby also flushing from the sludge geothermal brine entrapped therein.

Thus, in one preferred embodiment, the process may comprise dewatering the silicious sludge so that the weight percent of water in the sludge is less than about 30%, determining the amount of water remaining in the sludge, combining the dewatered silicious sludge with a hydraulic cementing material to provide a dry weight ratio of the sludge to the cementing material of between about 1 and about 9, combining with the silicious sludge and the cementing material a sufficient amount of water, over that remaining in the sludge, to cause activating of the hydraulic cementing material, and permitting the mixture of the silicious sludge, the cementing material and the water to cure so as to form a concrete material.

A corresponding composition of concrete, using silicious sludge obtained from geothermal brine, is provided, the composition also comprising a cementing material, such as a hydraulic cement, and an activating material for activating the cementing material. When the cementing material is a hydraulic cement, the activating material is water. In some instances, the composition may include a coarse aggregate to enhance the mixing process. Weight ratios and weight percentages of the constituents of the concrete are as above described.

BRIEF DESCRIPTION OF THE DRAWINGS

The present invention will be more readily understood by reference to the drawings in which:

FIG. 1 is a simplified diagram showing layout of an exemplary geothermal brine electrical generating power plant which produces, as a by-product of electricity, silicious sludge which is used, in accordance with the present process, for making a concrete material, FIG. 1a showing one part of the power plant and FIG. 1b showing the remainder of the power plant;

In the Figures, like elements and features are identified by like reference numbers.

DESCRIPTION OF THE PREFERRED EMBODIMENT

The present process for using silicious sludge obtained from silica-rich geothermal brine to make concrete can be better understood and appreciated by first considering an exemplary geothermal brine power plant in which the silicious sludge is produced as a by product of generating electricity. Shown, therefore, in simplified form in FIGS. 1a and 1b is an exemplary geothermal brine power plant 10 which comprises generally a brine handling portion 12 and an associated electric power generating portion 14.

In general, the function of brine handling portion 12 is the extraction of hot pressurized geothermal brine from the ground; conversion, by a flashing process, of part of the brine to steam for use by power generating portion 14 and reinjection into the ground of the flashed brine and of steam condensate (if any) returned from the power generating portion. As more particularly described below, silicious sludge is also produced in brine handling portion 12. The function of power generating portion 14 is the use of steam from brine handling portion 12 to produce electric power.

Brine handling portion 12 comprises generally a brine extraction stage 20, (FIG. 1a), a wellhead separation stage 22, a steam production (flashing) and silica crystallization stage 24, a steam conditioning stage 26, a brine clarification stage 28 in which silicious sludge is produced as a by-product, a brine filtering stage 30 (FIG. 1b) and a brine reinjection stage 32.

Figure 1A:
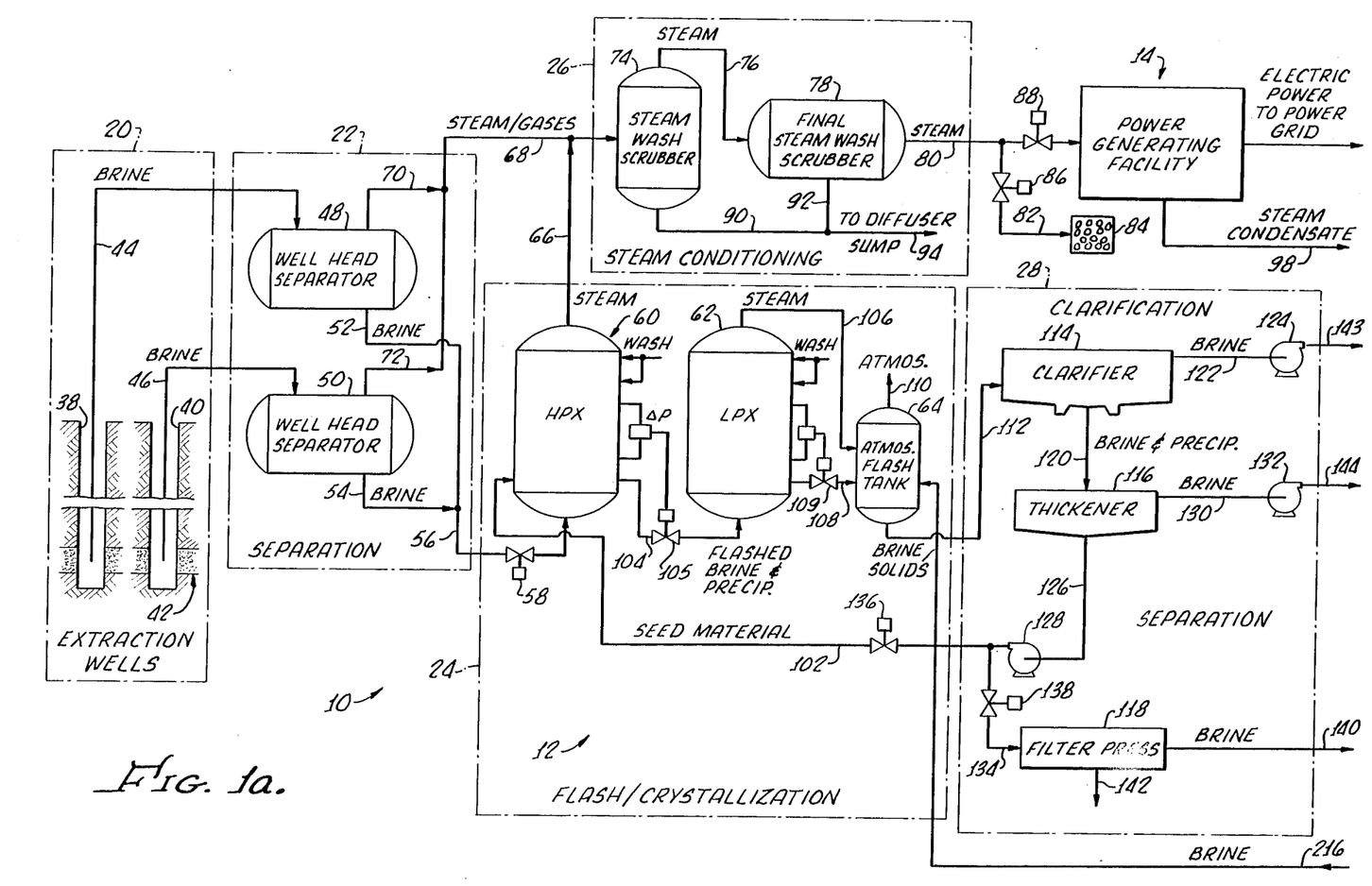
Figure 1B:
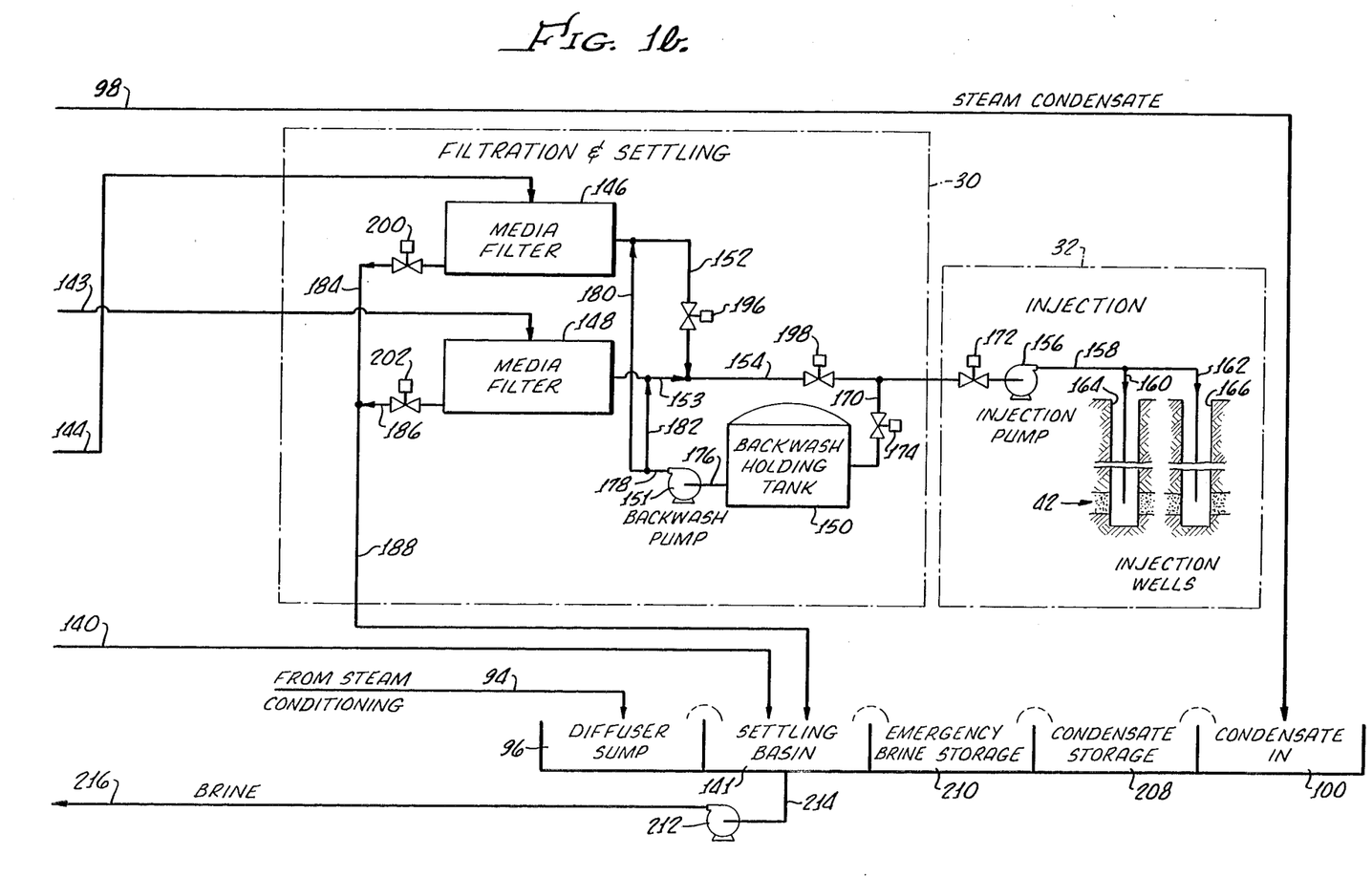

More specifically, brine extraction stage 20, as shown in FIG. 1a, includes first and second geothermal brine extraction wells 38 and 40 used to extract geothermal brine from an underground aquifer 42. At the wellhead, the geothermal brine contains liquid and vapor phases and may, as an illustration, have a temperature of between about 400° F. and about 500° F. and be at a natural pressure of between about 250 psig and about 500 psig, typical temperatures and pressures being about 450° F. and about 350 psig, respectively. Within aquifer 42, the brine temperature and pressure can be expected to be higher than at the wellhead and at the high aquifer temperatures and pressures, the geothermal brine dissolves substantial amounts of minerals and elements from the aquifer formation. Geothermal brine, therefore, normlly contains a high level of dissolved salts (hence, the name "brine") and may be supersaturated with silica, the principal constituent of rock. Moreover, the brine may contain, in solution, appreciable levels of such elements as lead, zinc, copper, iron, cadmium, silver, manganese, arsenic and antimony, and, of course, at least traces of most other elements. Also, gases such as hydrogen sulfide, ammonia and carbon dioxide are typically intermixed with the brine. Wellhead geothermal brine thus ordinarily comprises very heavily contaminated water and may have a slightly acidic pH of about 5 to 5.5.

From wells 38 and 40, the two phase brine is fed through conduits 44 and 46 to respective first and second wellhead separators 48 and 50 which comprise separator stage 22 (FIG. 1a). In wellhead separators 48 and 50, steam and such non-condensable gases as hydrogen sulfide and ammonia which are mixed with the brine are separated from the brine.

From wellhead separators 48 and 50, the liquid brine is fed through respective conduits 52 and 54 and a common conduit 56 and a flashing valve 58 into the bottom of a high pressure flash crystallizer (HPX) 60 which, together with a downstream low pressure flash crystallizer (LPX) 62 and an atmospheric flash vessel 64, principally comprises steam production (flashing) and silica crystallization stage 24. Across flashing valve 58 the brine is flashed to a reduced pressure of, for example, about 120 psig so as to convert part of the brine into steam. Within high pressure flash crystallizer 60, the two phase brine is separated and, as an illustration, for a brine flow of about 1.3 million pounds of about 450° F. and 350 psig brine per hour, about 95,000 pounds per hour of 120 psig of steam may be produced. Such produced steam is discharged from high pressure flash crystallizer 60, through a conduit 66, into a common steam discharge conduit 68 which also receives steam, through respective conduits 70 and 72, from wellhead separators 48 and 50. Conduit 68 discharges into a first steam scrubber 74 of steam conditioning stage 26. From first scrubber 74, steam is discharged through a conduit 76 to a second (final) steam scrubber 78. Clean steam is discharged from second scrubber 78, through a conduit 80, to power generating portion 14.

In the event the quality of steam discharged through conduit 80 from second scrubber 78 does not meet power generation requirements, for example, as to the level of total dissolved solids (TDS), the steam may be vented from conduit 80, through a conduit 82, to an atmospheric vent apparatus 84. Excess produced steam may also be vented in apparatus 84. Valves 86 and 88 in respective conduits 82 and 80 control the direction of flow of the steam from second scrubber 78.

Wash water from first and second steam scrubbers 74 and 78 is discharged, through respective conduits 90 and 92 and a common conduit 94, for example, to a diffuser sump 96 (FIG. 1b). Any unused condensed steam is returned from power generating portion 14, through a conduit 98, to a "condensate in" tank 100 in steam generating portion 12 (FIG. 1b) for subsequent disposal.

In order to reduce silica scaling in brine handling portion 12 by the controlled precipitation of silica, silicious seed material is fed, as described below, through a conduit 102, into high pressure flash crystallizer 60 from brine clarification stage 28. Within crystallizer 60, silica from the brine, which is typically supersaturated in silica as a result of reduced brine temperature and pressure, preferentially deposits or crystallizes (with a great many other impurities dissolved in the brine) from the brine onto the seed material as a silicious deposit, the brine and seed material being circulated together in crystallizer 60.

From high pressure flash crystallizer 60, liquid phase brine and silicious material suspended therein are flowed through a conduit 104 and a flashing valve 105 into the bottom of low pressure flash crystallizer 62. Across flashing valve 105 the liquid phase brine is flashed to a further reduced pressure, for example, about 10 psig, to convert additional brine into steam. The resulting two phase brine is fed into low pressure flash crystallizer 62 for separation. For the exemplary brine flow rate mentioned above, the amount of steam separated in low pressure flash crystallizer 62 may also be about 95,000 pounds per hour. Such additional steam, which has relatively low energy content, may be discharged from low pressure crystallizer 58 through a conduit 106 into atmospheric flash vessel 64 (as shown) or may be otherwise diverted for such use as facility heating. Within low pressure flash crystallizer 62, additional silica is usually deposited from the brine onto the silica particles suspended in the brine. From crystallizer 62, brine and the suspended silicious material are flowed through a conduit 108 and a third flashing valve 109, across which the brine is flashed to atmospheric pressure, thereby creating still more steam. Such steam is separated from the two phase brine in atmospheric vessel 64. Typically, steam is discharged from vessel 64 through a conduit 110 into the atmosphere, but may alternatively be used for other purposes. Silica deposition from the brine onto the suspended silicious material continues to some extent in atmospheric flash vessel 64.

Brine and the still suspended silicious material are discharged from vessel 64 through a conduit 112, to a recirculation-type, reactor-clarifier 114 which, with a thickener 116 and a filter press 118, principally comprises brine clarification and stabilization stage 28. Within reactor-clarifier 114, the silicious material suspended in the brine is settled from the brine as a silicious sludge which is removed, with some entrapped brine, from the bottom of the reactor-clarifier through a conduit 120. Clarified brine overflow, still containing, in suspension, small amounts of very fine silicious particulate matter, is discharged from reactor-clarifier 114, through a conduit 122, to a first filter pump 124. The wet silicious sludge discharged through conduit 120 has much of its entrapped brine removed in sludge thickener 116. Sludge, still, however, containing about 30% brine, is discharged from thickener 116, through a conduit 126, to a sludge pump 128. Brine extracted from the sludge in thickener 116 is discharged, through a conduit 130, to a second filter pump 132.

Sludge pump 128 pumps part of the silicious sludge, received through conduit 126, through conduit 102 back upstream into high pressure flash crystallizer 60 as seed material. The remainder of the sludge is pumped, through a conduit 134, into filter press 118. Valves 136 and 138, in respective conduits 102 and 134, control the flow of sludge from sludge pump 128. Brine extracted from the sludge in filter press 118 is flowed, through a conduit 140, to a settling basin 141 (FIG. 1b). Dewatered sludge, still, however, containing as much as about 16 weight percent of entrapped brine, is removed or discharged from filter press 118 through a conduit 142 and may advantageously be used for the making of concrete (geocrete) as more particularly described below. For the mentioned brine flow rate of about 1.3 million pounds per hour, the dewatered sludge may be discharged from filter press 118 at a rate of more than six tons per day, an amount which results in the sludge being a potentially valuable resource, or otherwise a waste product which is costly to dispose of.

Filter pumps 124 and 132 separately pump brine overflow from reactor-clarifier 114 and thickener 116, through respective conduits 143 and 144, into respective first and second media filters 146 and 148 (FIG. 1b) which, with a backwash holding tank 150 and a backwash pump 151, principally comprises brine filtering stage 30.

From filters 146 and 148, filtered brine is flowed through respective conduits 152 and 153, and a common conduit 154, to a brine injection pump 156. Filtered brine is pumped by pump 156, through a common conduit 158 and separate conduits 160 and 162, into first and second injection wells 164 and 166, respectively, which preferably (as shown) extend down to geothermal brine aquifer 42. Pump 156 and injection wells 164 and 166 principally comprise injection stage 32.

Within filtering stage 30, filtered brine can be diverted from conduit 154, through a conduit 170, into backwash holding tank 150, valves 172 and 174 in respective conduits 154 and 170 controlling the flow of filtered brine from filters 146 and 148. For backwashing filters 146 and 148, filtered brine is pumped by pump 151, through a conduit 176, from holding tank 150 through a common conduit 178 and conduits 180 and 182 into the filters in the reverse flow direction. Backwash brine is discharged from filters 146 and 148 through respective conduits 184 and 186, and a common conduit 188 into settling basin 141. Valves 196, 198, 200 and 202 in respective conduits 152, 154, 184 and 186, are provided for controlling brine flow for filter backwashing.

From "condensate in" tank 100, the condensate overflows into a condensate storage tank 208. An emergency overflow storage pond 210 is located between condensate storage vessel 208 and brine settling basin 141. Preferably, liquid from settling basin 141 is pumped, by a brine pump 212, through conduits 214 and 216, back upstream to atmospheric flash vessel 64 (FIG.

1a) for combining therein with the main flow of brine from low pressure flash crystallizer 62.

It is, of course, to be understood that power plant 10 is shown in FIG. 1 only by way of illustrative example and is necessarily shown simplified over an actual power plant which typically has other valves, conduits, controls and the like not shown or described herein.

PROCESS FOR MAKING CONCRETE (GEOCRETE) FROM GEOTHERMAL SLUDGE

Figure 2:
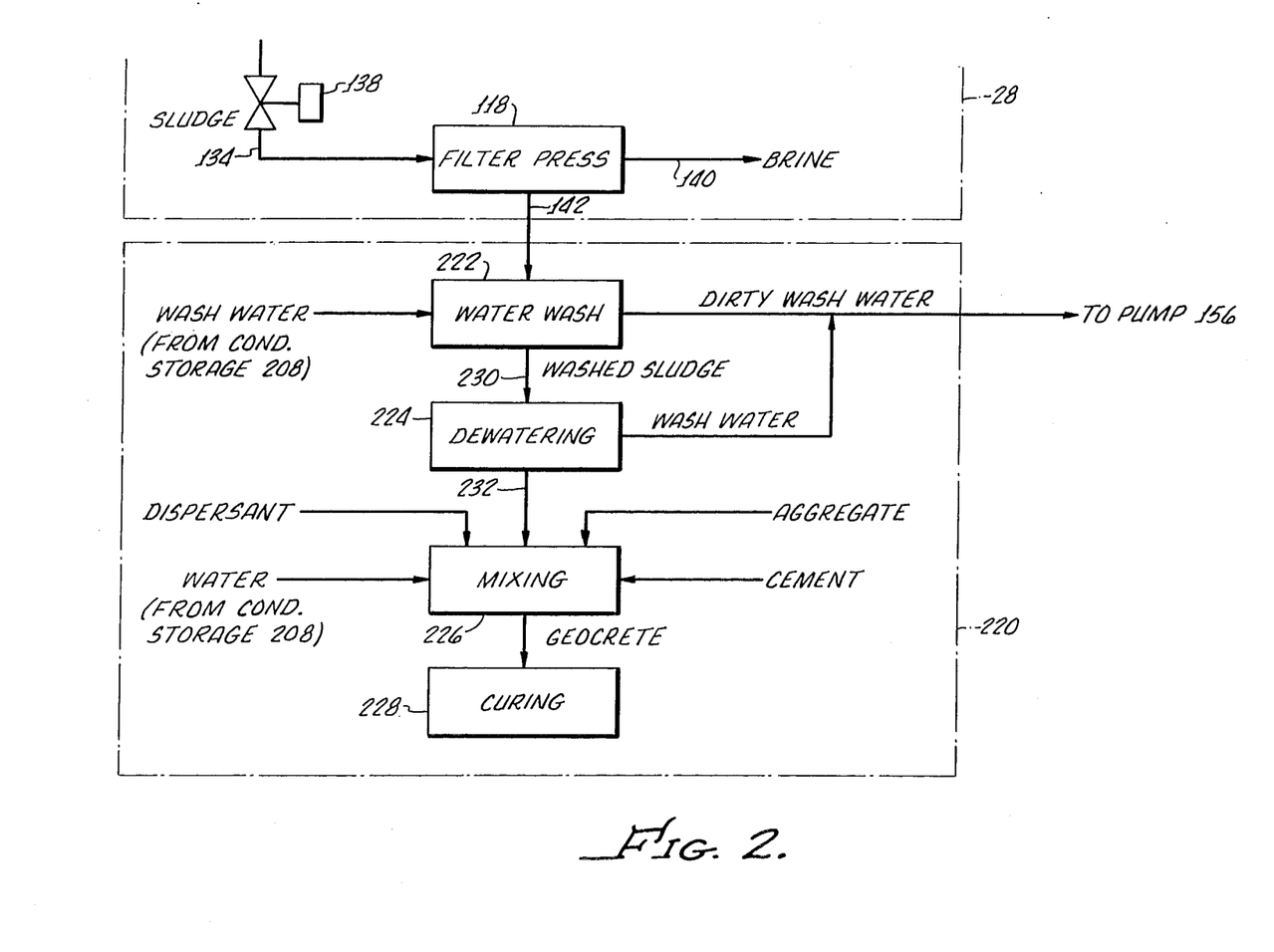
FIG. 2 is a flow diagram illustrating the concrete making process of the present invention.

FIG. 2 illustrates, in flow diagram form, the present process for using geothermal sludge (filter cake) to make a concrete material which may, for obvious reasons, be termed "geocrete." As shown, a geocrete making stage 220 comprises generally a filter cake washing stage 222, a dewatering stage 224, a mixing stage 226 and a concrete curing stage 228.

As mentioned above, geothermal brines typically contain a great many materials dissolved into the brine from the geothermal formation. These dissolved materials contained in most geothermal brines usually include such heavy metals as lead and zinc, as well as other toxic or harmful elements including arsenic, cadmium and copper. At least trace amounts of most of the materials dissolved in the brine precipitate along with silica when the silica deposits from the brine onto the seed material. Harmful or undesirable materials may, therefore, be present in filter cake discharged from filter press 118 by being loosely entrapped in the sludge or by being more tightly bound into the silicious structure of the sludge, as by chemical bonding. Moreover, significant amounts of these undesirable or harmful materials in the filter cake are present in the brine remaining entrapped in the sludge after sludge dewatering in filter press 118, the filter cake typically containing as much as about 16 percent by weight of entrapped brine.

In many circumstances, according to the amount of undesirable or harmful materials contained in the filter cake and/or local regulations governing the use and disposal of hazardous materials, it may be necessary or desirable to reduce the concentration of these materials in the filter cake before using the filter cake to make geocrete. This is to assure that the natural weathering of the geocrete will not, in time, result in the release from the geocrete of unallowable amounts of harmful materials.

Water washing of the filter cake from filter press 118 can generally significantly reduce the amount of undesirable materials contained in the filter cake. Such water washing of the filter cake in washing stage 222 serves both to displace, with clean water, geothermal brine entrapped in the filter cake and to flush out of the filter cake materials loosely held in the sludge. Water washing may also reduce the concentration of unwanted materials more tightly bound in the sludge structure. Because geothermal brines contain large concentrations of chlorides, washing of the filter cake until the used wash water tests free of chlorides, by silver nitrate testing, assures that any brine initially entrapped in the filter cake has been completely flushed from the filter cake. In some instances, other treatment, for example, acid leaching, of the sludge before its use in making geocrete, may additionally or alternatively be desirable to reduce the concentration of toxic or harmful materials.

If the filter cake from filter press 118 is processed at power plant 10, steam condensate supplied from condensate tank 208 (FIG. 1b) may advantageously be used for water washing of the filter cake from filter press 118. Such use of the condensate of steam obtained from the geothermal brine from which the sludge is also obtained, assures compatibility of the wash water with the brine entrapped in the sludge and with the sludge itself, so that additional precipitate is not formed and corrosion problems are not enhanced. In such case, the used wash water, containing brine and materials flushed from the filter cake, may advantageously be disposed of by pumping the discharged wash water (by a pump, not shown) to brine injection pump 156 (FIG. 1b) for injection thereby into the ground. By disposing of the used wash water in this manner, problems otherwise associated with disposal of the contaminated wash water are eliminated.

After having been washed, if necessary or desirable, in washing stage 222, the sludge is discharged, through a conduit 230, to dewatering stage 224, which may comprise a conventional filter press similar to filter press 118. Water extracted from the sludge in dewatering stage 224 is preferably combined, for disposal, with the used wash water discharged from washing stage 222, and may, therefore, also be conducted to injection pump 156 for injection into the ground.

Dewatered filter cake discharged, through a conduit 232 (or otherwise removed from dewatering stage 224) is preferably tested to determine the water content, which may typically be from about 10 to about 30 weight percent. This determination of the water content of the filter cake is needed to enable the determination of the dry weight of the filter cake so to permit proper mixing proportions in making the geocrete. Also, assuming that water is the activating material or agent for the cementing material used in making the geocrete, a determination of the water content of the filter cake is usually needed for calculating the amount of water to be added to the geocrete mixture, since the water remaining entrapped in the filter cake is also available for activating the cementing material.

At least partly because of the silica content of the geothermal brine filter cake and the residual water content therein, the cementing material used with the filter cake to make geocrete is preferably conventional portland cement, which is both readily available and relatively inexpensive. It is, however, to be understood that the invention is not limited to the use of portland cement as the cementing material, and other cementious materials such as flyash or lime may alternatively be used. By way of illustrative example, a type of portland cement used may be Type II cement.

Geocrete may be produced, according to the present invention, by either a slurry method or by a compacting method. In general, by the slurry method, the filter cake from dewatering stage 224 is mixed with cement and a sufficient amount of water to provide a pourable slurry. Alternatively, by the compacting method, filter cake and cement are mixed by a mixer such as a pug mill or in situ layers of filter cake and cement are intermixed by a tilling machine which also supplies a small amount of water to the mixture. After thorough mixing of the filter cake and cement, the mixture is compacted by heavy roller equipment.

However, in making geocrete by either the slurry or the compacting method, it is to be appreciated that, for economic reasons, the weight percent of geothermal filter cake used in making the geocrete should be as high as possible because of the cost of cement. Sufficient cement must, however, be used to provide a reasonable strong and durable geocrete.

Preferably, the dry weight ratio of geothermal sludge (filter cake) to cement in a filter cake and cement slurry mix is between about 1:1 to about 3:1, with the more preferred filter cake-to-cement ratio being about 2:1. In this filter cake-to-cement ratio range, good geocrete strengths are ordinarily obtained. However, where geocrete strength is not an important factor, the filter cake-to-cement weight ratio may be made substantially higher so as to provide greater filter cake utilization, and ratios as high as 8:1 or 9:1 may sometimes be useful.

It has been found by the present inventors that when mixing filter cake and cement in a conventional concrete tumbler or rotating drum, the filter cake tends to cling to the inner walls of the mixer and good intermixing of the filter cake and the cement is difficult unless undesirably high weight percentages of water are used. At such high weight percentages of water, however, the geocrete produced has a relatively low compression strength. This problem of adequate mixing of filter cake and cement in conventional slurry mixers can, it has been discovered, be overcome by adding coarse (about 1 inch) aggregate to the mix. For reasons of economy, the amount of aggregate used should be minimized and it has been determined by the present inventors that a dry weight percentage of aggregate is preferably between about 10 and about 50 percent, with a range of between about 15 percent and about 25 percent being more preferred.

When using aggregate, the preferred dry weight percentage of filter cake is between about 30 and about 70 percent. The amount of cement used may in such case be typically about 20 weight percent. For such filter cake, cement and aggregate weight percent ranges, it has been determined that the weight percent of water (including the water in the filter cake) should be between about 20 and about 50 percent of the dry weight of the filter cake, aggregate and cement.

When the geocrete is formed by the compaction process, aggregate is not required and is preferably not used to thereby minimize the geocrete costs. For the compacting process, a layer of filter cake about 4.5 inches thick may be spread in the area to be geocreted and about a 1.5 inch layer of cement is spread on top of the filter cake layer. This provides about a 3:1 weight ratio of filter cake-to-cement, as is desirable for economy and good geocrete strength. The two layers are tilled to intermix the materials while at the same time sufficient water is added to activate the cement. Including the water content in the filter cake, about a 30 weight percent of water may be used. Alternatively, as mentioned above, the filter cake and cement may be mixed in a pug mill. The dampened mix is then compacted by a heavy roller.

Chlorides in the water (or brine) entrapped in the filter cake accelerate the geocrete set time. Accordingly, the geocrete setting time can be increased by flushing the chloride-containing brine from the filter cake. Filter cake washing thus generally serves the dual purpose of reducing the toxicity of the filter cake and increasing the geocrete set time.

The present invention may be further described with reference to the following Examples.

EXAMPLE 1

Samples of geothermal brine-derived sludge, corresponding to the filter cake discharged from filter press 118, are obtained. The sludge has a residual moisture content of about 16 weight percent. Two batches of geocrete are made by mixing the sludge with Type II portland cement and water. The first batch (Batch 1) is made using a sludge-to-cement dry weight ratio of 2:1, and the second batch (Batch 2) is made using a sludge-to-cement dry weight ratio of 3:1. For both batches, an amount of water is used making the weight percent of water, including the water contained to the sludge, equal to about 41 percent of the combined dry weight of the sludge and cement.

After mixing the geocrete, amounts of both batches are poured into a number of separate molds, each of which is about 6 inches in diameter and about 12 inches high. All specimens so prepared are permitted to air cure and 9, 16 and 30 day compression (crush) strength tests are performed on specimens from both batches. The compression tests indicate that the strength of the geocrete increases with cure time, the test results being shown in Table 1 below.

TABLE 1

|  | Batch 1 | Batch 2 |
|---|---|---|
| Filter cake (sludge) (% dry weight) | 66.7 | 75. |
| Cement (% dry weight) | 33.3 | 25. |
| Filter cake/cement dry weight ratio | 2:1 | 3:1 |
| Water used (% of dry weight of filter cake and cement) | 41 | 41 |
| Compression strength (psig) |  |  |
| 9 days | 1165 | 1010 |
| 16 days | 1360 | 1200 |
| 30 days | 2620 | 2050 |

Table 1 also shows that the geocrete made with a filter cake-to-cement ratio of 2:1 (Batch 1) has a higher compression strength that the geocrete having a filter cake-to-cement ratio of 3:1 (Batch 2); although, both batches have a 30 day compression strength of over 2000 psig, as is desirable for using the geocrete for many structural purposes.

EXAMPLE 2

A sample of geothermal brine-derived sludge corresponding to the filter cake discharged from filter press 118 is obtained. The sludge has a residual moisture content of about 16 weight percent. Two batches of geocrete are made by mixing the sludge with portland cement and water. The first batch (Batch 1) is made by a slurry process, the dry weight ratio of filter cake-to-cement is about 2:1 and the amount of water used, including the water remaining in the filter cake, is equal to about 41 weight percent of the dry weight of the filter cake and cement. The second batch (Batch 2) is made by a compacting process using a 3:1 filter cake-to-cement ratio and 41 weight percent of water.

Geocrete from both batches are put into 2 inch cubic molds, the geocrete from Batch 2 being compacted in the molds using a 1 square inch compacting piston; about ¼ inch of mixture is added after each compacting until the molds are filled.

The test specimens from both batches are placed in a room temperature water bath to cure for 7 days. The 7-day compression (crush) strength of samples from both batches are determined and are found to be between about 700 and about 800 psig. Other test specimens from both batches are then immersed in water obtained from the Salton sea of southern California for a period of 28 days. After this immersion period, the compression strength of specimens from both batches of geocrete are determined and are found to be about 875 psig, indicating that the geocrete is not destroyed by immersion in briny water.

EXAMPLE 3

Two different samples of geothermal brine-derived sludge corresponding to the filter cake discharged from filter press 118 are obtained. The first sample (Sample 1) of the sludge is unwashed and the second sample of sludge (Sample 2) is washed. The two samples of sludge are used to make geocrete using a cementing material Class G oilwell cement in a filter cake-to-cement dry weight ratio of about 1:1 and sufficient water to make a slurry.

Samples of the cement, the two sludges and of the geocrete made from the two different sludges are chemically analyzed for various elements usually found in the geothermal sludges. The chemical analysis is performed by first leaching a crushed sample of the material with a 0.2M citric acid and then analyzing the leachate by known chemical analysis techniques (recommended by the California Assessment Manual). The results of the testing are shown in Table 2 and demonstrate that the elements tested for are tightly bound into the geocrete structure and do not readily leach therefrom.

TABLE 2

| Element | Sludge Sample 1 | | Sludge Sample 2 | | Cement |
|---|---|---|---|---|---|
| | Sludge | Geocrete | Sludge | Geocrete | |
| Arsenic | 0.62 | 0.17 | 1.2 | 0.17 | 0.17 |
| Barium | 27 | 4.5 | 25 | 3 | 2 |
| Copper | 0.9 | 2.4 | 23 | 11 | 2.3 |
| Fluoride | 8.0 | 1.7 | 4.0 | 1.3 | 0.86 |
| Lead | 3.9 | 0.5 | 144 | 4.4 | 0.5 |
| Mercury | 0.018 | 0.018 | 0.016 | 0.013 | 0.015 |
| Zinc | 13 | 0.2 | 8.2 | 0.4 | 1.2 |

(Concentrations are in Mg per liter.)

EXAMPLE 4

A sample of geothermal brine-derived sludge (filter cake) corresponding to filter cake discharged from filter press 118 is obtained. The filter cake obtained has a residual moisture content of about 15 percent. Using different weight proportions of the filter cake, portland cement, coarse aggregate (to enhance mixing) and water, 9 batches of geocrete are made using the slurry mixing process. A number of compression strength specimens from each geocrete batch are poured into separate molds, each of which is about 6 inches in diameter and about 12 inches high. All specimens are cured in water baths as suggested by ASTM concrete test methods.

After curing, different specimens from each batch are tested for compression (crush) strength after curing times of 7, 28 and 60 days. Specimens from some of the geocrete batches are additionally tested for compression strength after curing for 120 days.

The purpose of the testing is to determine acceptable mixing ratios of the geocrete ingredients and to determine optimum mixing ratios of the ingredients.

Figure 3:
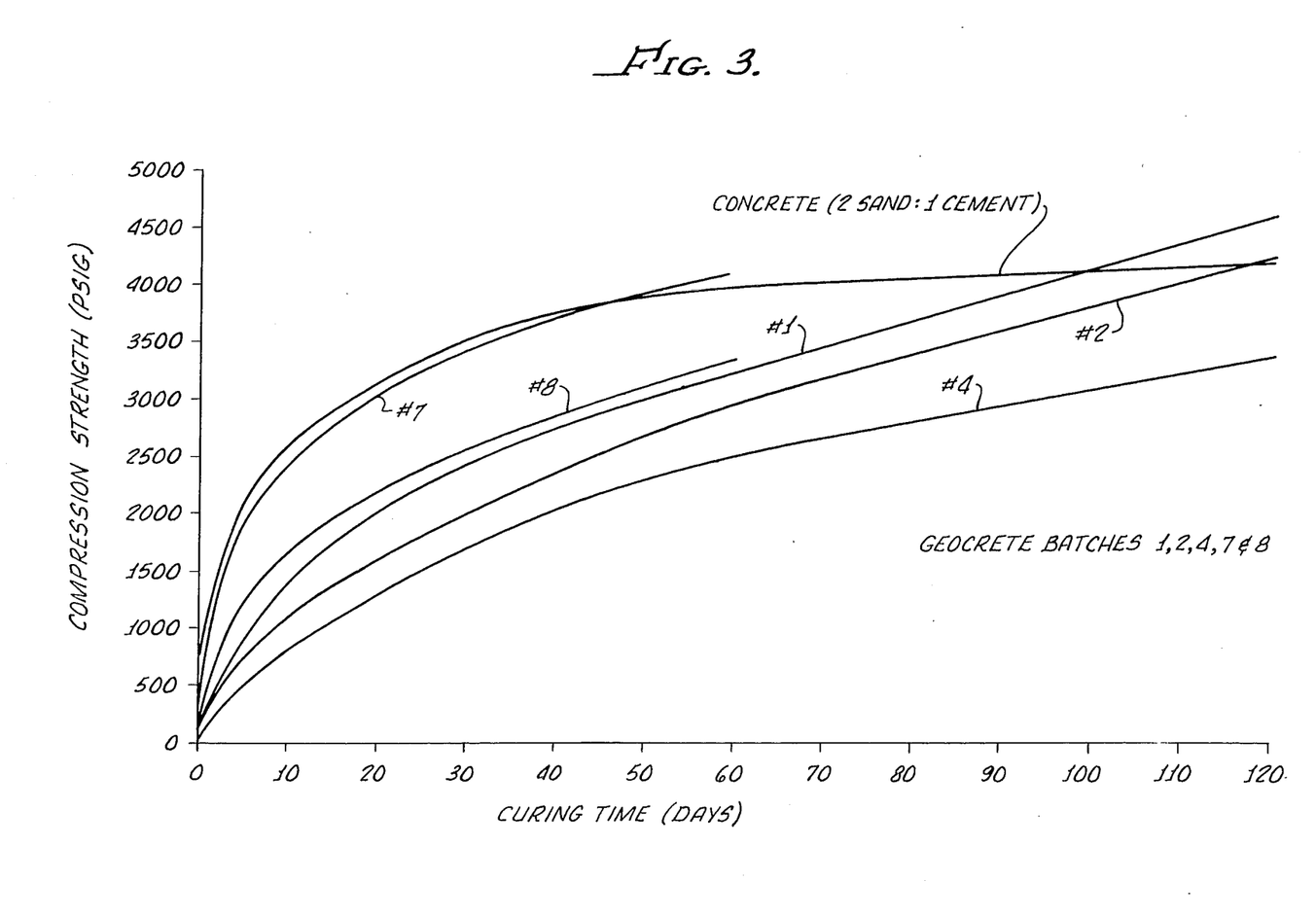
FIG. 3 is a graph on which is plotted compression strength as a function of concrete curing time for several different compositions of concrete made using geothermal brine-derived sludge, and also plotting, by way of comparison, the compression strength vs curing time for a conventional concrete material.

The composition of the various batches of geocrete, as well as the results of the compression strength testing, are shown in Table 3, the compression strength test results of representative ones of the geocrete batches being also shown in graph form in FIG. 3 wherein compression strengths are plotted as a function of curing time. Also plotted in FIG. 3, by way of comparison, is a compression strength vs. curing time curve for a conventional concrete made with a sand-to-cement ratio of 2:1.

TABLE 3

| | Geocrete Batch No. | | | | | | | | |
|---|---|---|---|---|---|---|---|---|---|
| | 1 | 2 | 3 | 4 | 5 | 6 | 7 | 8 | 9* |
| Cement (Wt. % of dry mix) | 27.76 | 21.15 | 21.15 | 17.87 | 26.41 | 24.85 | 21.75 | 17.71 | 17.55 |
| Water** (Wt. % of cement & dry filter cake) | 50 | 42 | 39 | 44 | 37 | 29 | 26 | 28 | 27 |
| Filter cake (Wt. % of dry mix) | 47.33 | 53.76 | 53.76 | 46.05 | 32.48 | 35.54 | 37.01 | 36.58 | 37.13 |
| Aggreg. (Wt. % of dry mix) | 24.91 | 25.09 | 25.09 | 36.08 | 41.11 | 39.61 | 41.24 | 45.71 | 45.31 |
| Filter cake/cement (dry Wt. ratio) | 1.71 | 2.54 | 2.54 | 2.58 | 1.45 | 1.68 | 2.00 | 2.43 | 2.49 |
| Compression Strength (psig) | | | | | | | | | |
| 7 days | 1240 | 740 | 1100 | 760 | 2090 | 2160 | 2330 | 1590 | 1040 |
| 28 days | 2410 | 1630 | 1800 | 1570 | 3130 | 2550 | 3410 | 2490 | 1790 |
| 60 days | 3220 | 2720 | 2900 | 2550 | 3290 | 2690 | 4030 | 3340 | 2550 |
| 120 days | 4600 | 4120 | 4230 | 3340 | — | — | — | — | — |

*retarding agent added to delay hardening
**including residual water content in filter cake

EXAMPLE 5

A sample of geothermal brine-derived sludge (filter cake) corresponding to filter cake discharged from filter press 118 is obtained. The filter cake obtained has a residual moisture content of about 20 percent. Using different weight proportions of filter cake, portland cement, flyash, coarse aggregate (to enhance mixing) and water, two batches (over 300 yd$^3$) of geocrete are made using the slurry mixing process. Compression strength samples from Batch 1 are poured into separate molds, each of which is about six inches in diameter and about 12 inches high. All specimens are cured in water baths as suggested by ASTM concrete test methods. Subsequent compression tests indicate that flyash is an effective cementing material and that the strength of geocrete increased with cure time, the test results being shown in Table 4 below.

TABLE 4

| | BATCH 1 | BATCH 2 |
|---|---|---|
| Cement (Wt. % of dry mix) | 16 | 11 |
| Flyash (wt. % of dry mix) | 7 | 11 |
| Water* (wt % of cement + flyash + dry filter cake) | 40 | 37 |
| Filter Cake (wt. % of dry mix) | 48 | 52 |

TABLE 4-continued

| | BATCH 1 | BATCH 2 |
|---|---|---|
| Aggregate (wt. % of dry mix) | 30 | 26 |
| Filter Cake/(cement + flyash) (dry wt. ratio) | 2.09 | 2.8 |
| Compression Strength (psig): | | |
| 7 days | 1325 | |
| 28 days | 2670 | |
| 62 days | 3040 | |

*Includes residual water content in filter cake.

Although particular embodiments of the invention have been described, for purposes of illustrating the manner in which the invention can be used to advantage, it will, of course, be understood that the invention is not limited thereto, since many obvious modifications can be made, and it is intended to include within this invention any such modifications as fall within the scope and spirit of the appended claims.

What is claimed is:

1. A process for using siliceous sludge precipitated from a silica-rich geothermal brine to produce a structural concrete material, the process consisting essentially of:
   a. combining the siliceous sludge precipitated from silica-rich geothermal brine with a portland type cement;
   b. combining with the siliceous sludge and the portland type cement, a sufficient amount of activating media to cause the cementing material to be activated; and,
   c. permitting the mixture of siliceous sludge, portland type cement, and activating media to cure into a structural concrete material.

2. The process as claimed in claim 1 wherein the activating media is water and the mixture of siliceous sludge, portland type cement and activating media is cured until it has a compression strength of at least about 2500 psig.

3. The process as claimed in claim 1 wherein the dry weight ratio of the sludge to the portland type cement is between about 1 and about 9.

4. The process as claimed in claim 1 wherein the dry weight ratio of the sludge to the portland type cement is between about 1 and about 3.

5. The process as claimed in claim 2 wherein the siliceous sludge contains water and including the step of dewatering the siliceous sludge before combining with the portland type cement so that the weight percent water content of the siliceous sludge before combining with the portland type cement is less than about 30%.

6. The process as claimed in claim 2 wherein the weight percent of water, including any water contained in the sludge, combined with the siliceous and the portland type cement is between about 20% and about 50% of the combined dry weight of the siliceous sludge and the portland type cement.

7. The process as claimed in claim 6 wherein the weight percent of water is about 40%.

8. The process as claimed in claim 1, including the step of water washing the siliceous sludge before the combining thereof with the cementing material.

9. A process for using siliceous sludge precipitated from silica-rich geothermal brine to produce a concrete meterial, the process consisting essentially of:
   a. dewatering the siliceous sludge so that the weight percent of water in the siliceous sludge is less than about 30% and determining the amount of water remaining in the siliceous sludge;
   b. combining the dewatered siliceous sludge with a portland type cement to provide a dry weight ratio of the sludge to the portland type cement of between about 1 and about 9;
   c. combining with the silceous sludge and the portland type cement a sufficient amount of water, including any remaining in the sludge, to cause activation of the portland type cement; and
   d. permitting the mixture of the siliceous sludge, the portland type cement and the water to cure so as to form a structural concrete material having a compression strength of at least about 2500 psig.

10. The process as claimed in claim 9 wherein the total weight percent of water is between about 20% and about 50% of the combined dry weight of the siliceous sludge and the portland type cement.

11. The process as claimed in claim 9 wherein the process includes permitting the mixture of the dewatered siliceous sludge, the portland type cement and the water to cure so as to form a structural concrete material having a compression strength of at least about 2500 psig.

12. A structural concrete material consisting essentially of:
   a. a siliceous sludge precipitated from silica-rich geothermal brine;
   b. a portland type cement capable of being activated by an activation media; and
   c. a sufficient amount of activation media to cause the portland type cement to be activated so as to enable the mixture of sludge, cementing material and activation media to cure into a structural concrete.

13. The concrete material as claimed in claim 12 wherein the dry weight ratio of the sludge to the portland type cement material is between about 1 and about 9.

14. The concrete material as claimed in claim 12 wherein the dry weight ratio of the sludge to the portland type cement material is between about 1 and about 3.

15. The structural concrete material as claimed in claim 12 having a compression strength of at least about 2500 psig.

16. The concrete material as claimed in claim 12 wherein the cementing material is a portland type cement and the activating media is water.

17. The concrete material as claimed in claim 16 wherein the weight percent of water, including any water in the sludge, in the combination of sludge and portland type cement is between about 20% and about 50%.

18. The concrete material as claimed in claim 17 wherein the weight percent of water is about 40%.

19. A concrete material consisting essentially of:
   a. a siliceous sludge precipitated from silica-rich geothermal brine;
   b. a portland type cement; and
   c. a sufficient amount of water, including any water in the siliceous sludge, to cause the portland type cement to be activated so as to enable the siliceous sludge and portland type cement to cure into a structural concrete.

20. The concrete material as claimed in claim 19 wherein the dry weight ratio of sludge to portland type cement is between about 1 and about 9.

21. The structural concrete material as claimed in claim 19 having a compression strength of at least about 2500 psig.

22. A process for producing a concrete material consisting essentially of:
   forming a slurry consisting essentially of siliceous sludge formed in the process of flashing geothermal brine, water and Portland cement; and
   allowing the slurry to cure into a structural concrete material.

23. The process as claimed in claim 22 wherein the slurry is formed with a dry weight ratio of siliceous sludge to Portland cement enabling the slurry to cure into a structural concrete material having a compression strength of at least about 2500 psi.

24. The process as claimed in claim 23 wherein the dry weight ratio of siliceous sludge to Portland cement is about 3 to 1.

25. A structural concrete material consisting essentially of:
   an aggregate consisting essentially of solids precipitated during the flashing of geothermal brine; and
   hydrated portland type cement.

26. The structural concrete material as claimed in claim 25 wherein the aggregate and portland type cement are present in proportions enabling the structural concrete to have a compression strength of at least 2500 psi.

27. The structural concrete material as claimed in claim 26 wherein the dry weight ratio of aggregate to portland type cement is less than about 3.

28. A structural concrete material having a compression strength greater than about 2500 psi consisting essentially of:
   an aggregate consisting essentially of solids derived from the flashing of geothermal brine; and
   hydrated portland type cement.

29. The structural concrete material as claimed in claim 28 wherein the dry weight ratio of aggregate to portland type cement is less than about 3.

* * * * *